United States Patent [19]
Mueller

[11] Patent Number: 5,855,456
[45] Date of Patent: Jan. 5, 1999

[54] APPARATUS AND METHOD FOR UNBLOCKING CONVEYING PIPE

[75] Inventor: Thomas J. Mueller, Genevieve, Mo.

[73] Assignee: Ultraflo Corporation, Ste. Genevieve, Mo.

[21] Appl. No.: 732,600

[22] Filed: Oct. 16, 1996

[51] Int. Cl.⁶ .................................................. B65G 51/02
[52] U.S. Cl. .............................. 406/11; 406/39; 406/136
[58] Field of Search ............................. 406/11, 39, 136, 406/137

[56] References Cited

U.S. PATENT DOCUMENTS

| | | | |
|---|---|---|---|
| 2,780,369 | 2/1957 | Kaney | 214/83.2 |
| 3,288,537 | 11/1966 | Hitch | 406/136 |
| 3,295,896 | 1/1967 | Hurtig et al. | 302/26 |
| 3,929,379 | 12/1975 | Krambrock | 302/24 |
| 4,059,311 | 11/1977 | Spitzer et al. | 302/53 |
| 4,515,503 | 5/1985 | Snowdon | 406/11 |
| 4,715,748 | 12/1987 | Krambrock | 406/11 |
| 4,775,267 | 10/1988 | Yamamoto | 406/50 |
| 4,861,200 | 8/1989 | Lübbehusen et al. | 406/14 |
| 4,909,676 | 3/1990 | Heep et al. | 406/14 |
| 4,917,544 | 4/1990 | Crahan et al. | 406/14 |
| 4,955,761 | 9/1990 | Federhen et al. | 406/12 |
| 5,071,289 | 12/1991 | Spivak | 406/11 |
| 5,199,826 | 4/1993 | Lawrence | 406/41 |
| 5,224,802 | 7/1993 | Federhen et al. | 406/95 |
| 5,248,227 | 9/1993 | Hidock et al. | 406/137 |
| 5,407,305 | 4/1995 | Wallace | 406/14 |

FOREIGN PATENT DOCUMENTS

| | | | |
|---|---|---|---|
| 2-182621 | 7/1990 | Japan . | |
| 404286536 A | 10/1992 | Japan | 406/11 |

*Primary Examiner*—Gary C. Hoge
*Attorney, Agent, or Firm*—Senniger, Powers, Leavitt & Roedel

[57] ABSTRACT

A bulk material conveying system for use with a bulk material holding tank having at least one outlet. The conveying system includes a main supply line for carrying pressurized gas and a material conveying line having an inlet and an outlet. The material conveying line is in communication with the holding tank outlet for transporting the bulk material from the holding tank to the conveying line outlet. The inlet of the material conveying line is in communication with the main supply line for receiving the pressurized gas whereby the gas moves the bulk material in the conveying line towards the conveying line outlet. The system further includes an aerator line having an inlet and an outlet and at least one connector for feeding the pressurized gas into the bulk material holding tank to agitate the bulk material and push it towards the holding tank outlet and a pressure sensor for sensing when the pressure in the material conveying line exceeds a predetermined level. A shut-off valve is connected to the main supply line for establishing communication between the main supply line and the aerator line and operable in response to the pressure sensor sensing the exceeding of pressure for shutting off flow of the pressurized gas from the main supply line to the aerator line thereby increasing gas flow to the material conveying line for eliminating buildup of bulk material in the material conveying line.

18 Claims, 2 Drawing Sheets

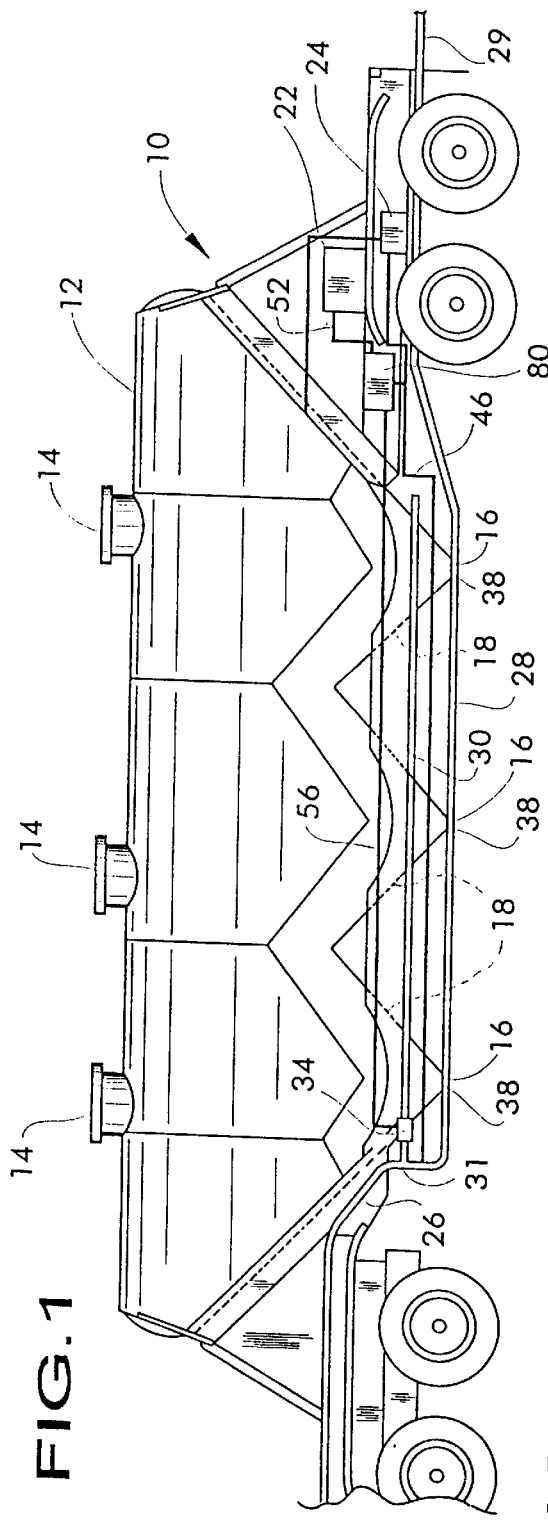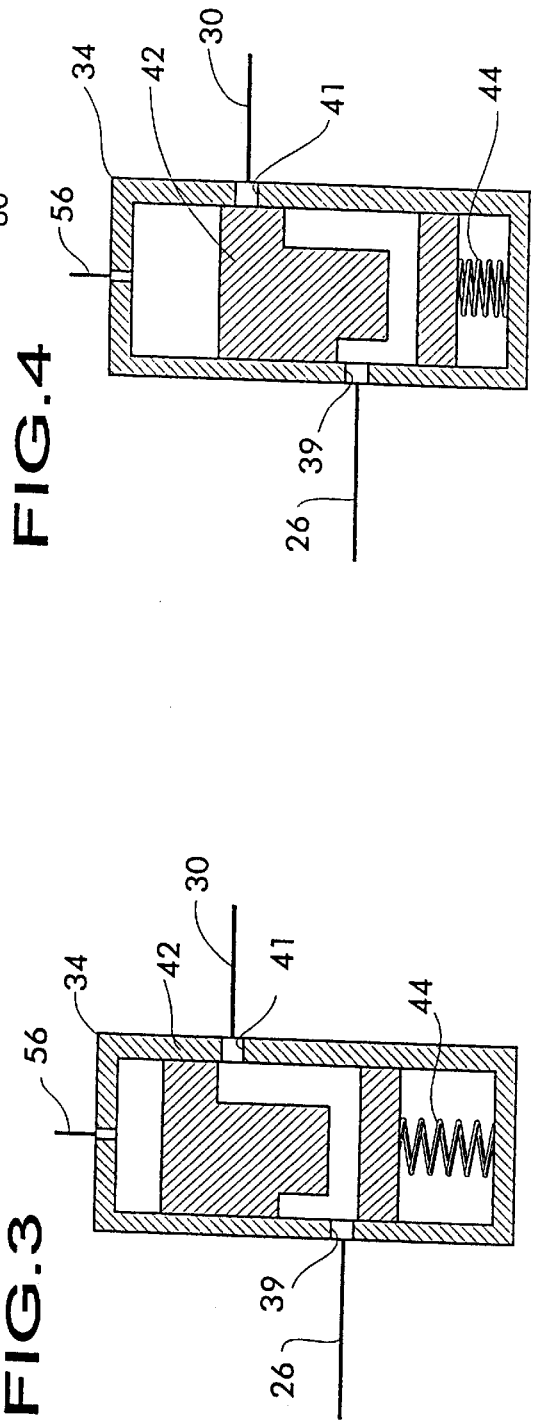

APPARATUS AND METHOD FOR UNBLOCKING CONVEYING PIPE

BACKGROUND OF THE INVENTION

This invention relates generally to trailer systems for carrying bulk material and more specifically to a system for unblocking an unloading line of the trailer. Bulk material is typically transported in a large hopper which is carried on a trailer of a truck. Upon the truck reaching its destination, the bulk material is unloaded from the hopper into a storage facility such as bin, hopper or elevator. Pressurized air or other gases are used to mix the bulk material within the hopper and force the bulk material out of the hopper and into the unloading line of the trailer. The bulk material commonly forms clumps while being fed through the unloading line thus requiring the line to be disassembled and cleaned. The unloading process is therefore time consuming due to clogging of the bulk material within the unloading line of the trailer. Material conveying systems have been developed wherein pressurized air external to the trailer system is piped into the unloading line at various locations to attempt to eliminate blockage within the line. These systems are generally expensive and require extensive modification to the trailer system due to the large number of electronic valves required to sense the pressure at various locations along the length of the line and the pneumatic valves and external air supply required to supply pressurized air at these locations.

There is a need, therefore, for a material unloading system, that is adaptable to existing trailer systems, compact, cost efficient, easy to use and effective in reducing the time required to unload bulk material from a hopper.

SUMMARY OF THE INVENTION

Among the several objects of this invention may be noted the provision of a bulk material unloading system that eliminates blockage of bulk material within an unloading line; the provision of a bulk material unloading system that reduces the time required to unload bulk material from a hopper; the provision of a bulk material unloading system that is compact, requires minimal installation space and is easy to install; the provision of a bulk material unloading system that is easily retrofitted on existing transport systems; and the provision of a bulk material unloading system that is inexpensive to manufacture and install.

A bulk material conveying system of the present invention is for use with a bulk material holding tank having at least one outlet. Generally, the conveying system includes a main supply line for carrying pressurized gas and a material conveying line having an inlet and an outlet. The conveying line is in communication with the holding tank outlet for transporting the bulk material from the holding tank to the conveying line outlet. The inlet of the material conveying line is in communication with the main supply line for receiving the pressurized gas whereby the gas moves the bulk material in the conveying line towards the conveying line outlet. The system further includes an aerator line having an inlet and an outlet and at least one connecting means for feeding the pressurized gas into the bulk material holding tank to agitate the bulk material and push it toward the holding tank outlet and pressure sensing means for sensing when the pressure in the material conveying line exceeds a predetermined level. A shut-off valve is connected to the main supply line for establishing communication between the main supply line and the aerator line and operable in response to the pressure means sensing the exceeding of pressure for shutting off flow of the pressurized gas from the main supply line to the aerator line thereby increasing gas flow to the material conveying line for eliminating buildup of bulk material in the material conveying line.

Other objects and features will be in part apparent and in part pointed out hereinafter.

BRIEF DESCRIPTION OF THE DRAWINGS

FIG. 1 is a side view of a trailer incorporating the bulk material conveying system of the present invention;

FIG. 3 is a schematic view of a shut-off valve of the system of FIG. 1 shown in its first open position; and FIG. 4 is a schematic view of the shut-off valve of the system of FIG. 1 shown in its second closed position.

Corresponding parts are designated by corresponding reference numerals in the several views of the drawings.

DESCRIPTION OF PREFERRED EMBODIMENTS

Figure 2:
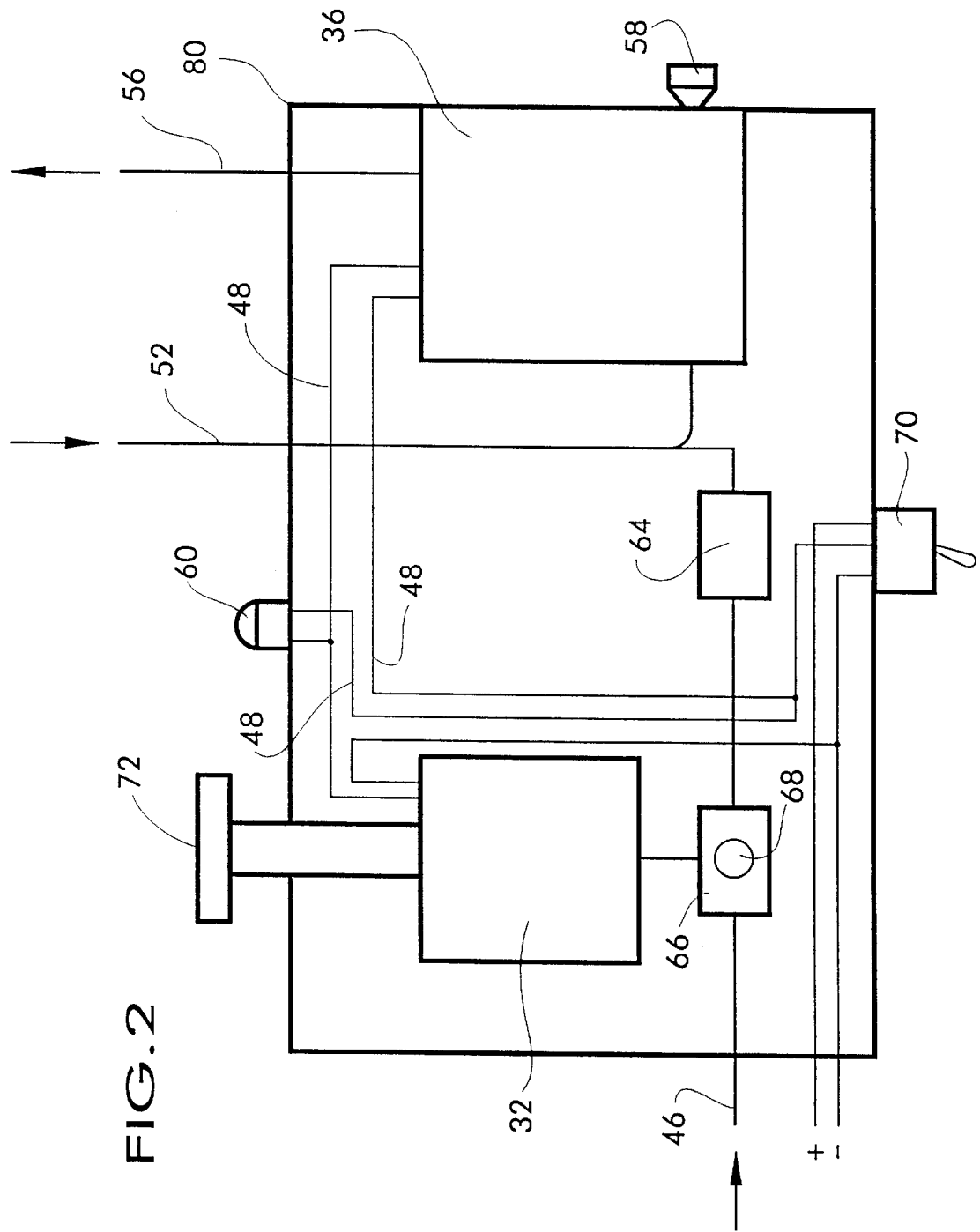
FIG. 2 is a schematic view of a manifold of the material conveying system shown in FIG. 1.

Referring now to the drawings, and first to FIG. 1, a trailer, indicated generally at 10 is shown for transporting bulk particulate material. The particulate material may be any powder, granular or pelletized product, for example. The trailer 10 includes a bulk material holding tank 12 such as a hopper having openings 14 in its top for filling the hopper with the bulk material and a plurality of discharge outlets 16 spaced along its bottom for delivering the bulk material. The holding tank 12 is formed to include cone shaped portions 18 along the bottom of the tank for promoting continuous flow of the material through the holding tank outlets. The trailer 10 includes a bulk material conveying system for use with the holding tank to more efficiently deliver the bulk material to a receiving area, such as a bin, hopper or elevator. Pressurized air or other inert gas is distributed within the holding tank 12 to force the bulk material through the openings in the bottom of the holding tank. The trailer 10 further includes a reservoir 22, a gauge box 24 and a compressor (not shown) for delivering pressurized air to the holding tank 12.

The bulk material conveying system includes a main supply line 26 for carrying pressurized air from the compressor to a material conveying line 28 and an aerator line 30 for mixing the bulk material within the holding tank 12 to prevent clogging of material within the tank 12, pressure sensing means 32 such as a pressure switch, for sensing pressure in the material conveying line, and a shut-off valve 34 for shutting off flow of air to the aerator line. When the material conveying line 28 gets clogged with the bulk material, the pressure sensor 32 senses the increased pressure in the line and sends a signal to a control valve 36 which operates the shut-off valve 34 to shut off flow of air to the aerator line 30 to increase the supply of air to the material conveying line. This increase in air flow in the material conveying line quickly generates an increase in pressure to disseminate the clogged bulk material within the material conveying line 28. Upon elimination of the blockage, the pressure drop in the material conveying line 28 is sensed by pressure sensor 32 which sends a signal to the control valve 36 to open the shut-off valve 34 to allow flow into the aerator line. The pressure sensor 32 and control valve 36 are integrally mounted in a manifold 80 (FIG. 2).

The main supply line 26 receives pressurized air from the compressor and delivers the air into the material conveying line 28 and aerator line 30. Pressurized air is preferably supplied to the main supply line 26 from a compressor located on the trailer, but may also be supplied independently from a source other than the trailer. The main supply line 26, material conveying line 28 and aerator line 30 may be of standard construction and have various cross section configurations. The material conveying line 28 has an outlet 29 for discharging the bulk material and an inlet 31 in fluid communication with the main supply line 26 for receiving pressurized air whereby the air moves the bulk material in the conveying line towards the conveying line outlet. As shown in FIG. 1, the material conveying line 28 includes three openings 38 formed along the length of the line for receiving bulk material from the holding tank 12. It is to be understood that at least one opening 38 is required but any number of openings may be used without departing from the scope of this invention. The connection of each holding tank outlet 16 to the material conveying line 28 may also include a manual shut-off valve (not shown) to control the flow of the bulk material out of the holding tank and into the material conveying line.

The main supply line 26 branches off to supply pressurized air to the aerator line 30 which extends generally parallel to the material conveying line 28. The input of gas into the holding tank 12 by the aerator line 30 agitates and churns the material within the holding tank to push the material towards the outlet 16 of the holding tank and is effective in breaking up a blockage of the holding tank outlet or the holding tank outlet passage by the particulate material. The aerator line 30 is preferably connected to the holding tank 12 at one or more locations adjacent to each outlet. The aerator line 30 may be attached to the holding tank 12 by a connector, or the line may be welded directly onto the holding tank. Hoses may also be used to transfer air from the aerator line 30 into the holding tank 12.

The shut-off valve 34 is connected to the main supply line 26 for establishing communication between the main supply line and the aerator line 30. The shut-off valve 34 is operable in response to the pressure sensor 32 sensing an increase in pressure above a predetermined level for shutting off flow of the pressurized gas from the main supply line 26 to the aerator line 30 thereby increasing air flow to the material conveying line for eliminating the buildup of bulk material in the material conveying line. This arrangement provides an increase in flow to the material conveying line 28 whenever the pressure in the material conveying line exceeds a first predetermined limit. The increased flow will be provided to the material conveying line 28 until the material blockage has dissipated at which time the pressure in the material conveying line will fall below a second predetermined level and the shut-off valve 34 will be opened, as further described below. This arrangement allows the system to use a single source of air to unblock the clogged line without requiring any additional input from a second air supply system.

The shut-off valve 34 is a normally open, two-way, two position valve. A schematic of the shut-off valve in its first open position is shown in FIG. 3 and in its second closed position in FIG. 4. Line 56 is in communication with the outlet of the control valve 36 and receives pressure for forcing a piston 42 against a spring 44 to connect port 39 to port 41, thus establishing communication between the main supply line 26 and the aerator line 30. It should be understood that other type of shut-off valves may be used, such as an electrically controlled valve, without departing from the scope of this invention.

The pressure sensor 32 measures the pressure in the material conveying line 28 and transmits a signal to the control valve 36 to control the shut-off valve 34. As shown in FIGS. 1 and 2 the pressure sensor 32, senses pressure in the material conveying line 28. Although the sensing location is shown to be in the material conveying line 28 downstream of the shut-off valve 34, the pressure may be sensed at other locations, such as in the main supply line 26, as long as the pressure increase due to blockage in the material conveying line can be detected. The pressure sensor 32 is located remotely from the shut-off valve 34 and the pressure from the material conveying line 28 is transferred to the pressure sensor 32 by a conduit 46. The conduit 46 can be formed from metal tubing, rubber hose or any other suitable material. The pressure drop due to frictional line losses through conduit 46 must be accounted for when determining the pressure sensor 32 actuation points. The pressure sensor 32 is designed to receive pressure from the material conveying line 28 and send a signal to control valve 36 upon the pressure in the material conveying line reaching a first predetermined level. The control valve 36 in turn closes the shut-off valve 34 which shuts off flow from the main supply line 26 to the aerator line 30, thus increasing flow to the material conveying line 28 for eliminating blockage of the line. When the pressure in the material conveying line 28 drops below a second predetermined level, the pressure sensor 32 sends a signal to the control valve 36 to open the shut-off valve 34 and allow flow through to the aerator line 30. The first and second pressure settings of the pressure sensor 32 for increasing and decreasing pressure, respectively, are set sufficiently far apart to allow for hysteresis and prevent inadvertent opening and closing of the shut-off valve 34 due to pressure transients in the material conveying line. The pressure sensor includes a manual adjustment valve for setting the pressure sensor actuation points. The pressure sensor may be of many different types, such as, electrical pressure transducers, pneumatic pressure switches, or pressure or electrically operated air valves.

The control valve 36 is a normally closed two-way, two position solenoid operated directional control valve. The solenoid valve is electronically connected to the pressure sensor 32 through electrical wiring 48. The control valve 36 and pressure sensor 32 are integrally mounted in a manifold 80 located at an end of the trailer near the reservoir 22 and opposite the shut-off valve 34. The reservoir 22 may be any reservoir configuration used on the trailer such as one for providing pressurized air for operation of the brakes or other parts of the trailer or may be located external to the trailer. A reservoir utilizing fluid pressure instead of pneumatic pressure may also be used. Air from the reservoir 22 is sent to the control valve 36 via line 52. When the control valve 36 is in its open position, it ports pressurized air from the reservoir 22 to line 56 connected to the shut-off valve 34, thus shuttling the shut-off valve to its closed position. The control valve 36 includes a manually operated valve 58 which can be used to manually open or close the control valve to control the flow of air from the main air supply line 26 to the aerator line 30. The control valve 36 and pressure sensor 32 are provided with electrical power from the trailer 12 volt DC electrical system. It is to be understood that other power sources may also be used without departing from the scope of this invention.

Integrally mounted with the pressure sensor and control valve 36 in manifold 80 is an indicator 60 for indicating when the shut-off valve 34 is in its closed position. The indicator 60 can be a light or any other type of device that can readily be seen by an operator of the system. The light is electronically coupled to the pressure sensor 32 and control valve 36 for sensing when a signal is sent from the pressure sensor to the control valve 36 to close the shut-off valve 34.

The gauge box 24 is located in the vicinity of the reservoir 22 and control valve 36. The gauge box 24 includes a first gauge for monitoring pressure in the holding tank 12 and a second gauge for monitoring pressure in the material conveying line 28.

The material conveying system further includes a regulating device for setting the pressure setting of the pressure sensor while the holding tank 12 outlet is closed and the material conveying line 28 is open to atmosphere. It may be necessary to set the pressure sensor 32 setting when the system is not operating and the holding tank outlets are closed. This is normally not possible because there is no resistance in the material conveying line 28, thus no pressure can be built up and provided to the pressure sensor 32. The regulating device includes a regulator 64 and a shuttle valve 66 for shutting off flow of the pressurized gas to the pressure sensor 32 and connecting the pressure sensor with the regulator which is in fluid communication with the reservoir 22. The shuttle valve 66 has a first bypass position in which pressure from the material conveying line 28 is directed to the pressure sensor as in normal operation. By shuttling the shut-off valve 34 to its second pressure sensor setting position, pressure from the reservoir 22 is directed to the pressure sensor 32. The pressure sensor 32 can then be set by a manual valve 72 located on the pressure sensor with reference to the reservoir 22 pressure. The shuttle valve 66 includes a manual valve 68 for moving the shuttle valve from its first position to its second position and vice versa. The shuttle valve 66 may be a butterfly valve or any other suitable type of manually operated pneumatic valve. The shuttle valve 66 and regulator 64 are preferably integrally mounted in the manifold 80 with the pressure sensor 32 and control valve 36, thus providing a compact system design.

An override switch 70 is also provided to override the control valve 36 if needed, when the material conveying line 28 is blocked and the shut-off valve 34 is in its closed position. The override switch 70 shuts off electrical power to the control valve 36 so that even when the pressure in the material conveying line 28 exceeds the predetermined limit, the shut-off valve 34 can be opened to allow flow from the main supply line 26 to the aerator line 30.

During normal operation, the bulk material is discharged through the outlets 16 of the holding tank 12 into the material conveying line 28 and transported by the pressurized air from the main supply line 26. The main supply line 26 also provides pressurized air to the aerator line 30 which agitates and forces the bulk material out of the holding tank 12 and into the material conveying line 28. If the material conveying line 28 gets clogged with a build up of bulk material, the pressure within the material conveying line will increase. This increase in pressure is sensed by the pressure sensor 32 which in turn sends a signal to the control valve 36 which opens to send pressurized air from the reservoir 22 to the shut-off valve 34 to shut off flow from the main supply line 26 to the aerator line 30. All of the flow from the main supply line 26 is then sent directly to the material conveying line 28 to eliminate blockage of the line. As the clogged bulk material in the material conveying line 28 is dissipated the pressure within the material conveying line reduces and the pressure sensor 32 senses the decrease in pressure and sends a signal to the control valve 36 which shuts off flow from the reservoir 22 to the shut-off valve 34. The shut-off valve 34 moves to its open position and once again diverts a portion of the main supply line 26 flow to the aerator line 30.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A bulk material conveying system for use with a bulk material holding tank having at least one outlet, said conveying system comprising a main supply line for carrying pressurized gas;

a material conveying line having an inlet and an outlet, said conveying line being in communication with the holding tank outlet for transporting the bulk material from the holding tank to the conveying line outlet, the inlet of said material conveying line being in communication with the main supply line for receiving the pressurized gas whereby the gas moves the bulk material in the conveying line towards the conveying line outlet;

an aerator line having an inlet and an outlet and at least one connecting means for feeding the pressurized gas into the bulk material holding tank to agitate the bulk material and push it towards the holding tank outlet;

pressure sensing means for sensing when the pressure in the material conveying line exceeds a predetermined level; and a shut-off valve connected to the main supply line for establishing communication between the main supply line and the aerator line and operable in response to the pressure means sensing said exceeding of pressure for shutting off flow of the pressurized gas from the main supply line to the aerator line thereby increasing gas flow to the material conveying line for eliminating buildup of bulk material in the material conveying line.

2. A bulk material conveying system as set forth in claim 1 further comprising a control valve controlling said shut-off valve and wherein said pressure sensing means comprises a pressure switch for sensing the pressure and supplying a signal to the control valve to act to close the shut-off valve upon the pressure exceeding the predetermined value.

3. A bulk material conveying system as set forth in claim 2 wherein said control valve is a normally closed two-way, two position solenoid valve, controlled by the pressure switch.

4. A bulk material conveying system as set forth in claim 2 wherein said control valve has an inlet for receiving fluid and an outlet for delivering fluid to the shut-off valve when the control valve is in an open position.

5. A bulk material conveying system as set forth in claim 2 wherein said pressure switch and control valve are integrally mounted in a housing located remote from said shut-off valve.

6. A bulk material conveying system as set forth in claim 2 further comprising a manually operated switch for manually controlling the control valve.

7. A bulk material conveying system as set forth in claim 1 wherein said shut-off valve is a normally open, two-way, two position valve.

8. A bulk material conveying system as set forth in claim 4 wherein said shut-off valve has a first open position in which fluid is ported from said main supply line to said aerator line and a second closed position in which flow is shut off from said main supply line to said aerator line.

9. A bulk material conveying system as set forth in claim 8 wherein said shut-off valve includes a spring biased piston and a control port for receiving fluid from said control valve to force said spring biased piston towards a closed position in which flow is shut off from said main supply line to the aerator line.

10. A bulk material conveying system as set forth in claim 1 further comprising a reservoir for supplying fluid to the control valve for controlling the shut-off valve.

11. A bulk material conveying system as set forth in claim 1 further comprising a gauge box having a first gauge for monitoring pressure in the holding tank and a second gauge for monitoring pressure in the material conveying line.

12. A bulk material conveying system as set forth in claim 1 further comprising an indicator providing an indication when the shut-off valve is in its closed position.

13. A bulk material conveying system as set forth in claim 12 wherein said indicator comprises a light operable in response to the pressure sensing means.

14. A bulk material conveying system as set forth in claim 1 further comprising a regulating device for setting the predetermined level of the pressure sensing means while the holding tank outlet is closed.

15. A bulk material conveying system as set forth in claim 14 wherein said regulating device comprises a regulator, a shuttle valve for shutting off flow of the pressurized gas to the pressure sensing means and connecting the pressure sensing means with said regulator, said regulator being in communication with the reservoir for setting the predetermined level of the pressure sensing means relative to the pressure of the fluid in the reservoir.

16. A bulk material conveying system as set forth in claim 15 wherein the shuttle valve has a first position in which the flow of the pressurized gas is directed to the pressure sensing means and a second position in which the pressure sensing means is in fluid communication with said regulator, said system further comprising a switch for manually controlling the position of the shuttle valve.

17. A bulk material conveying system as set forth in claim 1 further comprising an override switch for opening the shut-off valve with the pressure in the material conveying line exceeding a predetermined level.

18. A method for conveying bulk material from a bulk material holding tank having at least one outlet, said method comprising supplying pressurized gas from a main supply line;

allowing the bulk material to flow from the holding tank into a material conveying line having an inlet in communication with the main supply line and an outlet for distributing the bulk material;

feeding pressurized gas from an aerator line to the holding tank for pushing the bulk material towards the outlet of the holding tank;

monitoring the pressure in the material conveying line;

closing a shut-off valve connected to the main supply line and the aerator line upon sensing a pressure increase in the material conveying line above a predetermined level to shut off flow of the pressurized gas from the main supply to the aerator line thereby increasing gas flow to the material conveying line for eliminating buildup of bulk material in the material conveying line.

* * * * *